United States Patent [19]

Yamaguchi

[11] Patent Number: 4,620,450
[45] Date of Patent: Nov. 4, 1986

[54] METHOD OF EVALUATING TIGHTENING CONDITION OF SCREW

[75] Inventor: Ikuo Yamaguchi, Hiroshima, Japan
[73] Assignee: Mazda Motor Corporation, Japan
[21] Appl. No.: 762,337
[22] Filed: Aug. 5, 1985

[30] Foreign Application Priority Data

Aug. 7, 1984 [JP] Japan ................................. 59-165149

[51] Int. Cl.$^4$ ............................................. B23P 19/06
[52] U.S. Cl. ................................... 73/862.23; 73/761; 29/240; 29/407
[58] Field of Search ................ 73/761, 862.23, 862.24; 29/240, 407; 364/508; 340/665

[56] References Cited

U.S. PATENT DOCUMENTS

| | | | |
|---|---|---|---|
| 4,106,176 | 8/1978 | Rice et al. ......................... | 364/508 X |
| 4,179,786 | 12/1979 | Eshghy ................................. | 29/407 |
| 4,344,216 | 8/1982 | Finkelston ............................ | 29/407 |

Primary Examiner—Charles A. Ruehl
Attorney, Agent, or Firm—Gerald J. Ferguson, Jr.; James E. Bryan; Michael P. Hoffman

[57] ABSTRACT

When tightening a screw member with a nut runner, the turning angle of the screw member and the tightening torque of the same are detected. The ratio of increase in torque to increase in the tightening turning angle, that is, the torque increasing rate is calculated. Tightening of the screw member is terminated when the force imparted to the screw member exceeds the elastic limit of the screw member and reaches a predetermined tightening point in the plastic range. The total tightening turning angle and the final tightening torque are detected upon termination of the tightening. The elastic tightening turning angle portion of the total tightening turning angle is calculated on the basis of the final tightening torque and the torque increasing rate in the elastic range, and the plastic tightening turning angle portion of the total tightening turning angle portion is calculated by subtracting the elastic tightening turning angle portion from the total tightening turning angle. The plastic tightening turning angle portion thus obtained is compared with a preset tolerance range to evaluate the tightening.

3 Claims, 3 Drawing Figures

F I G.1
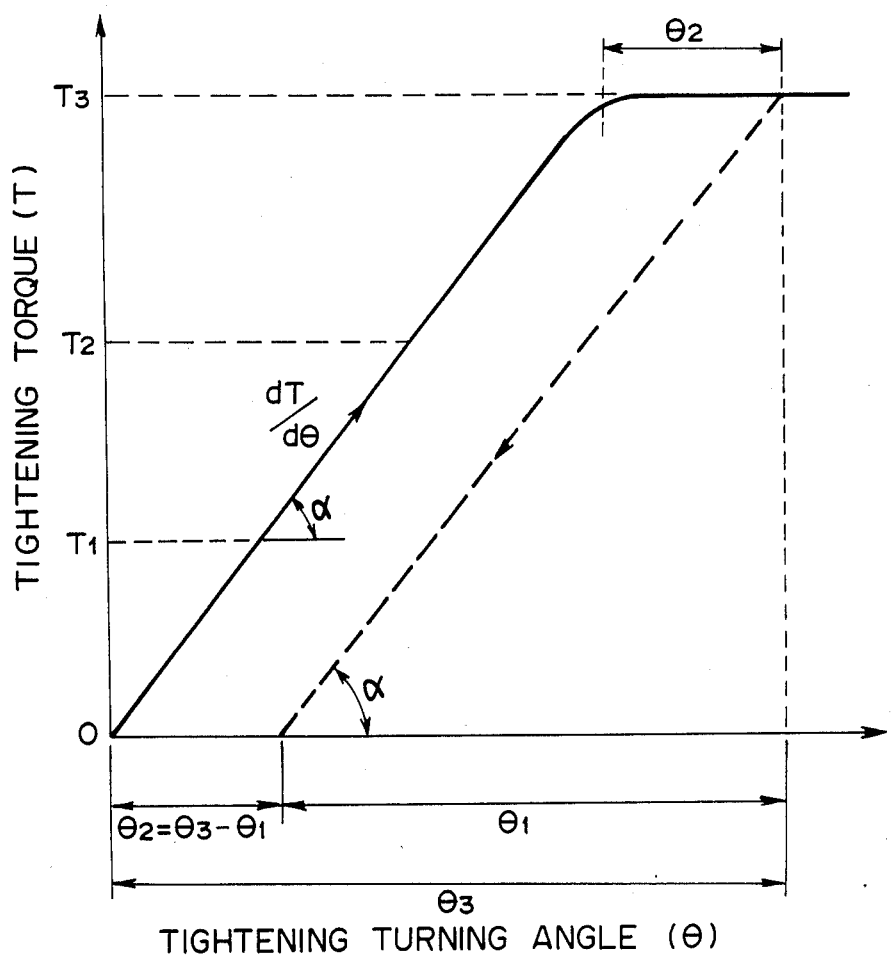

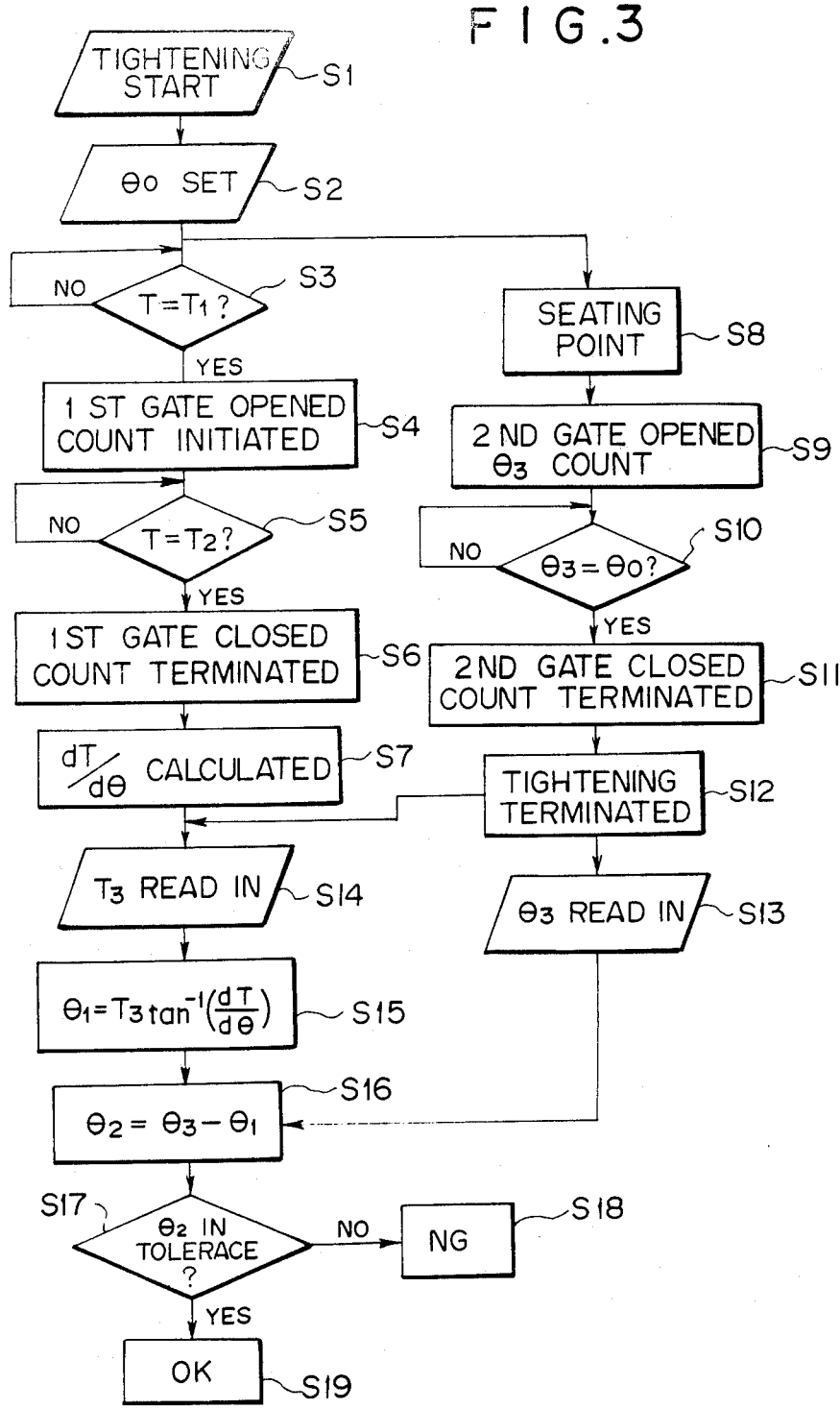

METHOD OF EVALUATING TIGHTENING CONDITION OF SCREW

BACKGROUND OF THE INVENTION

1. Field of the Invention

This invention relates to a method of evaluating the tightening condition of a screw member tightened in plastic tightening by a nut runner.

2. Description of the Prior Art

For example, a cylinder head is clamped to a cylinder block by tightening ten or so clamp bolts by a nut runner. The tightening condition of the clamp bolts must be strictly controlled. As described in Japanese Patent Publication No. 55(1980)-35653, it is preferred, in order to obtain a substantially constant axial clamping force, that tightening of a screw member be terminated when the force imparted to the screw member slightly exceeds the elastic limit of the screw member into the plastic range. This manner of tightening a screw member is generally referred to as "plastic tightening". In the plastic tightening, when the force imparted to the screw member before terminating tightening enters far into the plastic range, the fatigue strength of the screw member is lowered and accordingly the tightening condition must be more strictly controlled.

In the above Japanese patent publication, the plastic tightening condition is controlled by a "torque gradient method" in which the instantaneous gradient of a torque-revolution curve while a screw member is tightened, and also whether or not the state of change in the instantaneous gradient signal representing the instantaneous gradient comes to indicate a special point such as a yield point, i.e., whether or not change in the torque increasing rate (ratio of increase in torque to increase in the tightening turning angle) is reduced below a predetermined value, is detected, and the time the tightening of the screw member is to be terminated is determined on the basis of the detection. However, the torque increasing rate changes in the elastic range depending on the manufacturing accuracy of the screw member, physical properties of the member to be clamped by the screw member and the like, and accordingly if the change in the elastic range is similar to that indicating the yield point, the change can be mistaken for the change indicating the yield point to terminate tightening of the screw member before it is sufficiently tightened up.

SUMMARY OF THE INVENTION

In view of the foregoing observations and description, the primary object of the present invention is to provide a method of precisely evaluating the plastic tightening condition of a screw member, thereby facilitating optimal control of the plastic tightening.

In accordance with the present invention, when tightening a screw member with a nut runner, the turning angle of the screw member and the tightening torque of the same are detected. The ratio of increase in torque to increase in the tightening turning angle, that is, the torque increasing rate is calculated. Tightening of the screw member is terminated when the force imparted to the screw member exceeds the elastic limit of the screw member and reaches a predetermined tightening point in the plastic range. The total tightening turning angle and the final tightening torque are detected upon termination of the tightening. The elastic tightening turning angle portion of the total tightening turning angle is calculated on the basis of the final tightening torque and the torque increasing rate in the elastic range, and the plastic tightening turning angle portion of the total tightening turning angle is calculated by subtracting the elastic tightening turning angle portion from the total tightening turning angle. The plastic tightening turning angle portion thus obtained is compared with a preset tolerance range to evaluate the tightening.

More particularly, during plastic tightening of a screw member with a nut runner, the ratio of increase in torque T2-T1 (FIG. 1) when the tightening torque T increases from T1 to T2 to increase in the turning angle $\theta$ in the elastic range in which the turning angle and the tightening angle linearly change is calculated. That is, the torque increasing rate $dT/d\theta$ representing the inclination $\alpha$ of turning angle-tightening angle curve is calculated. The tightening torque T3 and the turning angle $\theta$ upon termination of tightening are detected. Elastic tightening turning angle $\theta 1$, when the tightening torque T3 upon termination of tightening is assumed to be the elastic limit torque, is calculated on the basis of the torque increasing rate $dT/d\theta$ (inclination or angle $\alpha$). The difference $\theta 2$ between the detected turning angle $\theta 3$ upon termination of tightening and the elastic tightening angle $\theta 1$ ($\theta 2 = \theta 3 - \theta 1$) represents the turning angle in the plastic range (the amount of plastic elongation of the screw member). The plastic tightening turning angle $\theta 2$ is compared with a preset value. When the plastic tightening angle $\theta 2$ for a given screw member is larger than the preset value, it is determined that the amount of plastic elongation of the screw member is larger than the tolerance and the screw member is insufficient in load bearing ability. On the other hand, when the plastic tightening turning angle $\theta 2$ is smaller than the preset value, it is determined that the screw member has not been subjected to plastic tightening yet.

BRIEF DESCRIPTION OF THE DRAWINGS

FIG. 1 is a graph for illustrating the principle of calculating the plastic tightening angle portion, FIG. 3 is a flow chart for illustrating the operation of the system shown in FIG. 2.

DESCRIPTION OF THE PREFERRED EMBODIMENT

Figure 2:
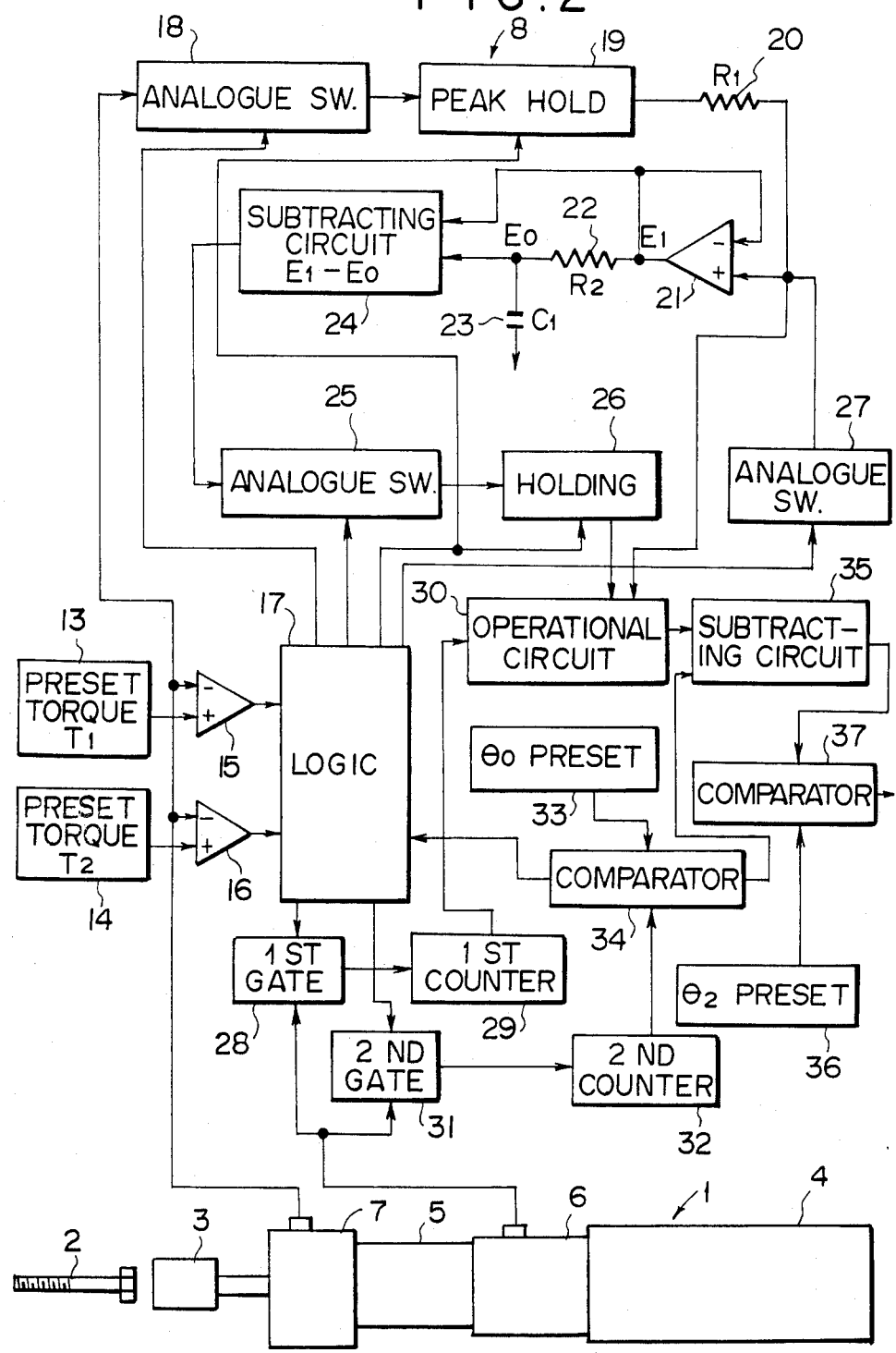
FIG. 2 is a block diagram showing a system for carrying out the method of the present invention.

In FIG. 2, a nut runner 1 is provided with a socket 3 adapted to be engaged with a screw member 2 such as a bolt or a nut. The driving force of a motor 4 is transmitted to the socket 3 by way of reduction gears 5. The nut runner 1 is further provided with a turning angle detector 6 for detecting the tightening turning angle $\theta$ and a torque detector 7 for detecting the tightening torque.

The detecting signals of the turning angle detector 6 and the torque detector 7 are delivered to an evaluating circuit 8 for evaluating tightening condition of the screw member 2. In the evaluating circuit 8, the ratio of increase in torque T2-T1 when the tightening torque T increases from T1 to T2 to increase in turning angle $\theta$ in the elastic range, that is, the torque increasing rate $dT/d\theta$ is stored. The tightening torque T3 and the turning angle $\theta$ upon termination of tightening are detected. Elastic tightening turning angle $\theta 1$ is calculated on the basis of the torque increasing rate $dT/d\theta$. The difference $\theta_2$ between the detected turning angle $\theta_3$ upon termination of tightening and the elastic tightening angle $\theta_1$ ($\theta_2 = \theta_3 - \theta_1$) representing the turning angle in the plastic range is then calculated. The plastic tightening turning angle $\theta_2$ is compared with a preset value having a predetermined width. That is, it is determined whether or not the plastic tightening angle $\theta_2$ is within a preset range. When the plastic tightening angle $\theta_2$ for a given screw member is above the preset value, it is determined that the amount of plastic elongation of the screw member is larger than the tolerance and the screw member is insufficient in load bearing ability. On the other hand, when the plastic tightening turning angle $\theta_2$ is below the preset value, it is determined that the screw member has not yet been subjected to plastic tightening.

More particularly, the output signal of the torque detector 7 for detecting the tightening torque of the nut runner 1 is input into first and second comparators 15 and 16 and compared with preset torque values T1 and T2 respectively generated from preset torque value generators 13 and 14.

The outputs of the first and second comparators 15 and 16 are input into a logic circuit 17 which opens and closes first and second gate circuits 28 and 31 according to the outputs of the comparators 15 and 16. The first gate circuit 28 controls initiation and termination of count of pulse signals from the turning angle detector in a first counter 29 and the second gate circuit 31 controls initiation and termination of count of pulse signals from the turning angle detector in a second counter 32. The preset torque values T1 and T2 generated from the preset torque value generators 13 and 14 have been experimentally determined in advance according to the screw member 2 to be used.

The logic circuit 17 closes an analogue switch 18 according to the output of the first comparator 15 to permit transmission of the output signal of the torque detector 7 to a peak hold circuit (memory circuit) 19 which stores a peak value of changing tightening torque T.

The peak value of the tightening torque T stored in the peak hold circuit 19 increases with progress of tightening. At this time, an analogue switch 27 is kept open by the logic circuit 17, and the output of the peak hold circuit 19 (D.C.) is delivered to a voltage follower 21 by way of a resistor 20. There is produced a voltage difference between the output E1 of the voltage follower 21 directly input into a subtracting circuit 24 and the output Eo of the same input into the subtracting circuit 24 by way of a circuit including a resistor 22 and a capacitor 23. The difference E1−Eo represents the torque increasing rate. That is, the output E1 has a voltage proportional to the present peak value and the output Eo has a voltage proportional to the peak value at a time earlier by a delay time determined by the value R2 of the resistor 22 and the capacity C1 of the capacitor 23. Therefore, the value R2 of the resistor 22 and the capacity C1 of the capacitor 23 are selected according to the torque increasing rate corresponding to the screw member 2 to be used. The subtracting circuit 24 calculates the voltage difference E1−Eo. The output of the subtracting circuit 24 is delivered to a holding circuit 26 by way of an analogue switch 25 which is closed under the control of a signal from the logic circuit 17, and stored in the holding circuit 26.

A tightening termination turning angle $\theta_o$ defining the point at which tightening of the screw member 2 by the nut runner 1 is to be terminated is set by a preset value generator 33 and the preset tightening termination turning angle $\theta_o$ generated by the preset value generator 33 is input into a comparator 34. Into the comparator 34 is also input a detecting signal from the second counter 32 representing the total tightening turning angle $\theta_3$, and when the total tightening turning angle $\theta_3$ becomes equal to the preset tightening termination turning angle $\theta_o$, an output of the comparator 34 is delivered to the logic circuit 17. When the output of the comparator 34 is delivered to the logic circuit 17, the logic circuit 17 stops the motor 4 of the nut runner 1, and at the same time, the logic circuit 17 delivers the signal stored in the holding circuit 26, the signal from the first counter 29 and the signal from the peak hold circuit 19 to an operational circuit 30 which calculates the elastic tightening turning angle $\theta_1 = T_3 \tan^{-1}(dT/d\theta)$.

Further, a signal representing the final total tightening turning angle $\theta_3$ generated by the comparator 34 on the basis of the signal from the second counter 32 and a signal from the operational circuit 30 representing the elastic tightening turning angle $\theta_1$ are input into a subtracting circuit 35 to calculate the plastic tightening turning angle $\theta_2(=\theta_3-\theta_1)$. The output of the subtracting circuit 35 is compared, by a comparator 37, with a preset value (tolerance) generated from a preset value generator 36 for setting a preset value of the plastic tightening turning angle $\theta_2$. The tightening condition of the screw member 2 is evaluated on the basis of the output of the comparator 37.

Now, the operation of the evaluating circuit 8 including the logic circuit 17 will be described with reference to the flow chart shown in FIG. 3.

In step S1, the motor 4 of the nut runner 1 is energized to start tightening of the screw member 2. In step S2, the preset tightening termination turning angle $\theta_o$ is read in. In step S8, a seating point at which the screw member is seated and from which the turning torque begins to increase or tightening of the screw member is initiated is calculated. In step S9, the second gate 31 is opened and the total tightening turning angle $\theta_3$ is detected by the second counter 32. Then in step S10, it is determined whether or not the detected total tightening turning angle $\theta_3$ is equal to the preset tightening termination angle $\theta_3$. When the detected total tightening turning angle $\theta_3$ becomes equal to the preset tightening termination angle $\theta_o$, the second gate 31 is closed (step S11). Thereafter, the motor 4 of the nut runner 1 is de-energized to terminate tightening (step S12).

During the tightening step described above, it is determined whether or not the torque value T detected by the torque detector 7 is equal to the preset torque value T1 in step S3. When the former becomes equal to the latter, the first gate 28 is opened to initiate counting of the tightening turning angle by the first counter 29 (step S4). Then in step S5, it is determined whether or not the detected torque T is equal to the preset torque value T2. When the former becomes to equal to the latter, the first gate 28 is closed to terminate counting of the tightening turning angle by the first counter 29 (step S6). Then, in step S7, the torque increasing rate $dT/d\theta$ is calculated.

After the tightening is terminated in the step S12, the total tightening turning angle $\theta_3$ is read in step S13, and the final tightening torque T3 is read in step S14. On the basis of these values, the elastic tightening turning angle $\theta_1$ [$=T_3\tan^{-1}(dT/d\theta)$] is calculated in step S15, and the plastic tightening turning angle $\theta_2$ ($=\theta_3-\theta_1$) is calculated in step S16. The calculated value of the plastic tightening angle θ2 is compared with the preset value in step S17 and when it is outside the tolerance range, it is determined that the tightening is not satisfactory (step S18) and otherwise it is determined that the tightening is satisfactory (step S19).

We claim:

1. A method of evaluating the tightening condition of a screw member tightened in plastic tightening by a nut runner means, comprising steps of tightening a screw member with a nut runner, detecting the turning angle of the screw member and the tightening torque, imparted to the same, calculating the ratio of increase in torque to increase in the tightening turning angle in the elastic range, terminating tightening of the screw member when the force imparted to the screw member exceeds the elastic limit of the screw member and reaches a predetermined tightening point in the plastic range, detecting the total tightening turning angle and the final tightening torque upon termination of the tightening, calculating the elastic tightening turning angle portion of the total tightening turning angle on the basis of the final tightening torque and the ratio of increase in torque to increase in the tightening turning angle in the elastic range, calculating the plastic tightening turning angle portion of the total tightening turning angle by subtracting the elastic tightening turning angle portion from the total tightening turning angle and comparing the plastic tightening turning angle portion thus obtained with a preset tolerance range to evaluate the tightening.

2. A method of evaluating the tightening condition of a screw member as defined in claim 1 in which said ratio of increase in torque to increase in the tightening turning angle is calculated by subtracting, by a subtracting circuit, an output of a torque detector input into the subtracting circuit by way of a delay circuit from an output of the same directly input into the subtracting circuit.

3. A method of evaluating the tightening condition of a screw member as defined in claim 2 in which said total tightening turning angle and the final tightening torque are detected respectively by a turning angle sensor and a torque sensor provided on the nut runner.

* * * * *